Patented Sept. 7, 1926.

1,599,282

UNITED STATES PATENT OFFICE.

CHAUNCEY C. LOOMIS, OF YONKERS, AND HORACE E. STUMP, OF BROOKLYN, NEW YORK, ASSIGNORS, BY MESNE ASSIGNMENTS, TO THE HEVEA CORPORATION, A CORPORATION OF NEW YORK.

MANUFACTURE OF RUBBER.

No Drawing. Application filed April 10, 1923. Serial No. 631,209.

This invention relates in general to the manufacture of rubber and has for its object broadly the provision of a more direct and economical process than has heretofore been existent.

A principal object of the invention is the provision of a process of making rubber articles direct from the latex itself and without the need of costly or complicated machinery or apparatus. Prior to our invention it has been generally the custom in the rubber industry to form crude rubber by complete coagulation of latex where the rubber is grown and after this rubber is received in this country to work into the crude rubber the various compounding ingredients, as vulcanizing agents, fillers, pigments, accelerators, etc. This last has been a difficult and costly operation and one which this invention contemplates entirely or substantially entirely eliminating.

Another important object of the invention is the provision of a process which will obviate the washing and milling of rubber, and which on this and other accounts will result in the production of a product of improved quality.

A particular use of the invention is the manufacture, economically, of rubber sheeting, rubberized or frictioned cloth, belting and the like, of improved quality and consequently the provision of a process for accomplishing such result is a particular object of the invention. The invention, however, from certain aspects has very much wider, valuable application, being capable, as will be presently manifest, of valuable use in the manufacture of rubber in any form and for any purpose.

In accordance with our present invention a natural latex (as rubber, gutta-percha, balata and the like) is partially coagulated and in the partially coagulated condition is formed or applied in the manner but very much more easily than the compounded rubber in the past and after application or forming the coagulation is completed. We have discovered that undialyzed latex may be partially coagulated with the usual rubber coagulants, such as acetic acid, or formic acid.

To do this it is necessary to first treat the latex with a stabilizing agent, such as formaldehyde, tannic acid, salts of the alkaline earths, or salts of the heavy tri-valent metals. If the coagulant be then added in small increments there is a progressive change, from a milky consistency to a plastic, non-elastic paste. In this condition the rubber is only partially coagulated, since complete coagulation produces the well-known elastic, non-plastic properties of crude rubber.

The plastic, non-elastic paste of semi-coagulated rubber cannot be produced with acetic or formic acids without the use of a stabilizer. The exact action of the stabilizer has not been ascertained, but it is believed that it jells the protein in the latex.

A paste of semi-coagulated rubber can also be produced by treating the latex with salts of the alkaline earths or of the heavy tri-valent metals without the addition of one of the usual coagulants. In this case the salts referred to appear to act both as stabilizer and coagulant.

In either of the above cases, if sufficient coagulant be added the latex will be completely coagulated into the usual crude rubber.

The present invention contemplates the addition of coagulant until a plastic paste of desired consistency is reached, which may be formed into substantially the form desired in the finished rubber. For example, this paste may be spread out in the form of a sheet of desired thickness. If thereafter the moisture is extracted, preferably by pressure although it may be otherwise extracted, the coagulation automatically continues to produce the irreversible rubber itself. If desired, protective colloids as gelatine, casein, agar agar, etc., may be incorporated in the latex to insure against premature conversion of the material into rubber. This paste may conveniently be applied by spreading it upon cloth or other fibrous material to produce rubberized or frictioned cloth or upon belting to provide friction surface. Thus constructed the material when finished gives a higher friction test than that produced in the manufacture of rubberized cloth, as previously produced where the material is frictioned by heavy machinery or the use of crude rubber in a naphtha solvent. If it is desired to vulcanize the material, as perhaps will usually be the case, the compounding ingredients may be incorporated in it before the coagulation, and experiment has demonstrated that thus incorporated, remarkably easy uniformity of distribution of the ingredients is obtained in the finished product.

This paste may also, of course, be spread out upon a wire or reticulate surface, pressed to extract the moisture, and the resulting sheet vulcanized to make a high grade but cheaply produced rubber sheeting. It is preferred that the moisture be extracted by pressing since in this event the soluble impurities are removed and if this is unimportant, evaporation of the moisture accomplishes otherwise the same result. From certain aspects of the invention it is therefore unimportant whether the moisture be extracted by pressure or evaporation and from certain aspects decidedly important.

We claim:—

1. The process, which comprises partially coagulating a natural latex to produce a plastic paste, forming the same into substantially the shape desired in the finished rubber article, and converting the formed material into rubber.

2. The process, which comprises mixing compounding materials with latex, partially coagulating the same to produce a plastic paste, forming it into substantially the shape of the rubber product desired, and converting the formed material into rubber.

3. The process, which comprises mixing compounding materials with latex, partially coagulating the same to produce a plastic paste, forming it into substantially the shape of the rubber product desired, converting the formed material into rubber, and vulcanizing.

4. The process, which comprises partially coagulating a natural latex into a plastic material, arranging said material in sheet form, and converting said sheet material into rubber.

5. The process, which comprises partially coagulating a natural latex to plastic form, spreading the same upon a fibrous sheet, and extracting the moisture to convert the material into rubber.

6. The process, which comprises partially coagulating a natural latex to plastic form, spreading the same upon a fibrous sheet, and pressing out the moisture to convert the material into rubber.

7. The process, which comprises adding a protective colloid to a natural latex and thickening the same by partially coagulating the latex to produce a plastic paste.

8. The process, which comprises, adding a protective colloid to a natural latex and thickening the same by partially coagulating the latex to a paste.

CHAUNCEY C. LOOMIS.
HORACE E. STUMP.